United States Patent
Hamel et al.

(10) Patent No.: US 9,453,160 B2
(45) Date of Patent: Sep. 27, 2016

(54) PLASTIC SCINTILLATOR MATERIALS, PLASTIC SCINTILLATORS COMPRISING SUCH MATERIALS AND METHOD FOR DISTINGUISHING NEUTRONS FROM GAMMA RAYS USING SAID SCINTILLATORS

(71) Applicant: Commissariat a l'energie atomique et aux energies alternatives, Paris (FR)

(72) Inventors: Matthieu Hamel, Cherbourg-Octeville (FR); Pauline Blanc, Paris (FR); Stephane Normand, Isigny le Buat (FR); Chrystele Dehe-Pittance, Maurepas (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/773,176
(22) PCT Filed: Mar. 6, 2014
(86) PCT No.: PCT/EP2014/054359
§ 371 (c)(1),
(2) Date: Sep. 4, 2015
(87) PCT Pub. No.: WO2014/135640
PCT Pub. Date: Sep. 12, 2014

(65) Prior Publication Data
US 2016/0017220 A1    Jan. 21, 2016

(30) Foreign Application Priority Data
Mar. 7, 2013 (FR) .................................... 13 52072

(51) Int. Cl.
*C09K 11/06* (2006.01)
*G01T 1/20* (2006.01)
(Continued)

(52) U.S. Cl.
CPC ............. *C09K 11/06* (2013.01); *C08K 5/1545* (2013.01); *C08K 5/3437* (2013.01); *C08K 5/353* (2013.01);
(Continued)

(58) Field of Classification Search
CPC ................ C09K 11/025; C09K 11/06; C09K 2211/1007; C09K 2211/1096; G01T 1/2018; G01T 3/06
See application file for complete search history.

(56) References Cited

U.S. PATENT DOCUMENTS

| | | |
|---|---|---|
| 4,495,084 A | 1/1985 | Shimizu et al. |
| 2012/0166120 A1 | 6/2012 | Corre et al. |

(Continued)

FOREIGN PATENT DOCUMENTS

| | | |
|---|---|---|
| FR | 2 399 683 A1 | 3/1979 |
| FR | 2 844 885 A1 | 3/2004 |

(Continued)

OTHER PUBLICATIONS

French Preliminary Search Report issued Sep. 10, 2013 in Patent Application No. 1352072 (with English translation of catagories of cited documents).

(Continued)

*Primary Examiner* — Mark R Gaworecki
(74) *Attorney, Agent, or Firm* — Oblon, McClelland, Maier & Neustadt, L.L.P.

(57) ABSTRACT

A plastic scintillator material, a plastic scintillator prepared by shaping the material, a detection portal, and a method for discrimination a signal due to fast neutrons. The plastic scintillator material including a polymeric matrix into which is incorporated at least one fluorescent compound at a mass concentration greater than or equal to 10% by mass of the total mass of the material. The polymeric matrix comprises a crosslinked polymer obtainable by polymerization of a mixture comprising at least one aromatic monomer and at least one monomer which is a crosslinking agent selected from the group consisting of an alkyl diacrylate, an alkyl dimethacrylate, and a mixture thereof, and molar proportions of the crosslinking monomer and of the aromatic monomer in the mixture are from 10% to 50% and from 90% to 50%, respectively.

27 Claims, 2 Drawing Sheets

(51) Int. Cl.
G01T 3/06 (2006.01)
C08K 5/1545 (2006.01)
C08K 5/3437 (2006.01)
C08K 5/353 (2006.01)
C09K 11/02 (2006.01)

(52) U.S. Cl.
CPC ........... C09K 11/025 (2013.01); G01T 1/2018 (2013.01); G01T 3/06 (2013.01); *C09K 2211/1007* (2013.01); *C09K 2211/1096* (2013.01)

(56) References Cited

U.S. PATENT DOCUMENTS

| | | |
|---|---|---|
| 2012/0318998 A1 | 12/2012 | Kondrasovs et al. |
| 2013/0299742 A1 | 11/2013 | Hamel et al. |
| 2014/0027646 A1 | 1/2014 | Zaitseva et al. |
| 2014/0312236 A1 | 10/2014 | Kondrasovs et al. |
| 2015/0346352 A1 | 12/2015 | Coulon et al. |
| 2015/0346362 A1 | 12/2015 | Kondrasovs et al. |

FOREIGN PATENT DOCUMENTS

| | | |
|---|---|---|
| FR | 2 969 169 A1 | 6/2012 |
| WO | WO 81/02866 A1 | 10/1981 |
| WO | WO 2011/060085 A2 | 5/2011 |
| WO | WO 2012/142365 A2 | 10/2012 |

OTHER PUBLICATIONS

International Search Report and Written Opinion issued Apr. 23, 2014 in PCT/EP2014/054359 (with partial English language translation).

International Preliminary Report on Patentability issued Jun. 25, 2015 in PCT/EP2014/054359 (with English language translation).

Natalia Zaitseva, et al., "Plastic scintillators with efficient neutron/gamma pulse shape discrimination" Nuclear Instruments and Methods in Physics Research A, vol. 668, XP028437952, 2012, pp. 88-93.

Paolo Peerani, et al., "Testing on novel neutron detectors as alternative to $^3$He for security applications" Nuclear Instruments and Methods in Physics Research A, vol. 696, 2012, pp. 110-120.

RT Kouzes, et al., "Neutron Detector Gamma Insensitivity Criteria" PNNL-18903, Oct. 28, 2009, 18 Pages.

F. D. Brooks, et al., "Pulse Shape Discrimination in a Plastic Scintillator" IRE Transactions on Nuclear Science, 1960, pp. 35-38.

J. Iwanowska, et al., "Neutron/gamma discrimination properties of composite scintillation detectors" JINST 6 P07007 [http://iopscience.iop.org/1748-0221/6/07/P07007], 2011, 12 Pages.

Patrick L. Feng, et al., "Spectral- and Pulse-Shape Discrimination in Triplet-Harvesting Plastic Scintillators" IEEE Transactions on Nuclear Science, vol. 59, No. 6, Dec. 2012, pp. 3312-3319.

Stéphane Normand, et al., "Discrimination methods between neutron and gamma rays for boron loaded plastic scintillators" Nuclear Instruments and Methods in Physics Research A, vol. 484, 2002, pp. 342-350.

PLASTIC SCINTILLATOR MATERIALS, PLASTIC SCINTILLATORS COMPRISING SUCH MATERIALS AND METHOD FOR DISTINGUISHING NEUTRONS FROM GAMMA RAYS USING SAID SCINTILLATORS

TECHNICAL FIELD

The invention relates to a plastic scintillator material or plastic scintillation material, i.e. a material comprising a polymeric matrix into which is incorporated at least one fluorescent compound.

The invention further relates to a plastic scintillator or scintillation detector comprising this material.

The invention finally relates to a method for discriminating neutrons from gamma rays using these scintillators.

Let us specify that in the present description, by plastic scintillator or scintillation detector is meant an apparatus comprising said scintillator material put in an adequate form for its use.

The technical field of the invention may generally be defined as that of detection of particles, such as neutrons, and radiations.

More exactly, the technical field of the invention may be defined as that of selective detection of neutrons and in particular of fast neutrons with respect to gamma rays.

The invention notably finds its application in nuclear instrumentation, particles physics, fundamental and applied research in physics, the petroleum industry, and the fight against anti-terrorism for detecting nuclear and radiological threats (NR).

STATE OF THE PRIOR ART

There exist many fields in which detection of neutrons is important and where it is necessary to have reliable and specific information on their signature.

Unfortunately, detection of neutrons is always hampered by the fact that, simultaneously with the signal due to neutrons, other parasitic signals are collected, notably due to gamma emissions. In particular, detection of fast neutrons and discrimination of their signal with respect to the signal of gamma rays is primordial in many fields, notably that of the detection of illicit trafficking of nuclear materials such as plutonium.

In this respect, document [1] studies the various detectors of neutrons and of gamma rays presently available on the market which are notably implemented in portals for detecting radiations ("Radiation Portal Monitors" or RPM) at transit points such as frontiers, airports, ports and railway stations in order to detect small amounts of radioactive materials transported by persons or in vehicles or containers.

It appears that none of the apparatuses shown in this document is totally satisfactory and all have both advantages and drawbacks.

Plastic scintillators have the benefit of having a low cost, notably in security applications at frontiers (anti-terrorism associated with nuclear and radiological hazard NR) where a significant amount of detectors are required.

Plastic scintillators comprise fluorescent molecules set in a polymer having transparency properties at their specific emission wavelength. These plastic scintillators should have a certain number of properties, for example listed in document [2], in order to be compatible with the criteria, mentioned in document [3] which neutron detectors have to meet.

It has been considered for a long time that it was not possible to achieve discrimination by the pulse shape between fast neutrons and gammas in plastic scintillators.

However, document [4] (BROOKS) relates to a plastic scintillator material formed by a polymeric matrix which contains fluorophores.

This document studies the influence of various variables on pulse shape discrimination ("PSD") obtained with this scintillator.

These variables are:
  the nature of the main monomer from which is prepared the polymer. Styrene, methylstyrene, and vinyltoluene are studied.
  the polymerization conditions.
  the application of a secondary monomer selected from naphthalene and 4-isopropyl-biphenyl (IP) for preparing the polymer.
  The use of a compound which causes cross-linking of the polymer selected from divinylbenzene (DVB) and allyl methacrylate.
  fluorophores, selected from p-terphenyl, PPO, PBD, and POPOP, and concentrations thereof.

A preferred plastic scintillator consist of a non-cross-linked vinyltoluene polymer comprising 10% by weight of IP, containing 35 g/L of p-terphenyl and 0.5 g/L of POPOP.

The scintillator of this document has significant deformations and whitening over time which makes its use practically impossible.

The document [5] describes the preparation of a composite scintillator comprising grains of organic single-crystals such as stilbene or p-terphenyl set in a matrix of polysiloxane.

This scintillator did not show any efficiency for achieving n/γ discrimination beyond a few centimeters in thickness.

The document [6] relates to a plastic scintillator comprising a polymeric matrix which contains a primary fluorophore at a content of more than 5% by mass and optionally a secondary fluorophore.

It is specified that the fluorophore may be cross-linked with the polymeric matrix but it is not indicated that the latter is itself actually cross-linked.

The polymeric matrix may be a polymer notably selected from among polyvinyltoluene (PVT), polystyrene, and polyvinylxylene.

The secondary fluorophore may for example be 1,4-bis-(5-phenyl-2-oxazolyl)-benzene (POPOP) or 1,4-bis-(2-methylstyryl)-benzene (bis-MSB).

The scintillator of this document lacks stability over time.

Document [7] relates to luminescent materials for neutron/gamma discrimination which comprise a host material doped with a luminophore.

The host material may be a polymer such as polyvinylcarbazole, polyvinyltoluene or polystyrene.

The luminophore is an organometallic complex for which the preparation is long and requires several steps. It is therefore difficult to obtain large amounts of this complex; which prevents the use of the luminescent material of this document for preparing scintillators with a significant volume, for example of more than 5 L.

Finally, document [8] relates to a scintillator for high temperatures which comprises a host polymer which contains a primary fluorescent agent and a wavelength converter.

The host polymer is a cross-linked copolymer with an aromatic cross-linking agent, for example a copolymer of a derivative of styrene such as t-butylstyrene, and of a compound with a higher melting point, such as 4-vinylbiphenyl. The cross-linking agent is for example divinylbenzene.

The primary fluorescent agent is for example p-terphenyl and the wavelength converter is for example 2,5-bis(4-biphenylyl)-1,3,4-oxadiazole.

The scintillator of this document cannot achieve discrimination between fast neutrons and gamma.

Considering the foregoing, it appears that the incorporation of a fluorescent molecule generally at a high concentration, for example of more than 10% by mass, is at the origin of a strong degradation of the physicochemical and morphological strength of the plastic scintillator materials which is therefore expressed in particular by whitening and deformation phenomena over time.

Now, the slightest release or precipitation of a fluorophore which notably causes whitening of the material irreversibly degrades the performances of the scintillator both in terms of scintillation quality and in terms of discrimination quality.

Further, the scintillator materials of the prior art as represented by the documents studied above have a still insufficient transparency.

Indeed, as scintillator materials are by definition materials emitting light after interaction between a radiation and matter, geometrical efficiency losses are inevitable but it is crucial to reach an intrinsic efficiency of the actual scintillator material, of 100%, and the polymer making up the matrix should therefore be as transparent as possible at the emission wavelength of the incorporated fluorophore(s).

Considering the foregoing, there therefore exists a need for a plastic organic scintillator material which allows effective discrimination between the signal of fast neutrons and the signal of gamma rays, and which further is not subject to both physical and morphological ageing over time.

In other words, there exists a need for a plastic scintillator material for which stability over time is improved, the physicochemical properties of which are maintained over time and which notably do not exhibit any whitening or deformation—the effects related to ionizing radiations being excluded-over time.

In particular, the performances of this scintillator material both in terms of scintillation quality and in terms of discrimination quality, initially excellent should not degrade over time even over a period which may attain several years.

There further exists a need for a plastic scintillator material which allows preparation of scintillators of large volume, which may attain as much as 1 m$^3$, notably for radiation detection portals.

There also exists a need for a plastic scintillator material which is more transparent than the materials of the prior art.

Finally there exists a need for a plastic scintillator material which may be prepared with easily available basic products and with a low cost, which are globally less expensive than the materials of the prior art and which may be prepared by a simpler method than the materials of the prior art.

SUMMARY OF THE INVENTION

This goal and further other ones are attained, according to the invention with a plastic scintillator material comprising a polymeric matrix in which is incorporated at least one fluorescent compound at a mass concentration of more than or equal to 10% by mass of the total mass of the material, in which the polymeric matrix consists of a cross-linked polymer which may be obtained (is obtainable) by polymerization of a mixture comprising at least one aromatic monomer and at least one monomer playing the role of a cross-linking agent selected from among alkyl diacrylates, alkyl dimethacrylates, and mixtures thereof, the molar proportions of the monomer playing the role of a cross-linking agent and of the aromatic monomer in the mixture being from 10% to 50% and from 90% to 50%, respectively.

Generally, said at least one fluorescent compound is an organic compound.

Herein, when mention is made of an alkyl group and unless indicated otherwise, generally means a linear or branched alkyl group generally of 1 to 20C, preferably from 1 to 10C, still preferably from 2 to 6C, better from 2 to 4C such as a methyl, ethyl, isopropyl, n-propyl, n-butyl, isobutyl or tertiobutyl group; or a cyclic alkyl group generally of 3 to 10C, preferably of 3 to 6C such as a cyclopropyl, cyclobutyl, cyclopentyl, or cyclohexyl group.

Preferably, said at least one fluorescent compound is incorporated at a mass concentration from 10% to 30% by mass of the total mass of the material.

By aromatic monomer is generally meant herein a monomer comprising at least one aromatic ring, and further a polymerizable group.

Said polymerizable group is generally selected from among groups comprising an ethylenically unsaturated carbon-carbon double bond such as the vinyl group.

The plastic scintillator material according to the invention has never been described in the prior art, as notably defined by the aforementioned documents.

The material according to the invention fundamentally differs from the plastic scintillator materials of the prior art in that its polymeric matrix consists of a specific polymer.

This polymer is first of all defined by the fact that this is a cross-linked polymer, in other words a copolymer which is prepared by polymerization of a main, aromatic, monomer, and of a monomer playing the role of a cross-linking agent.

In the plastic scintillator materials of the prior art, this is most of the time a non-cross-linked homopolymer such as a polystyrene or a polyvinyltoluene which is used.

Further, the monomer playing the role of a cross-linking agent is a specific monomer which is selected from among alkyl diacrylates, alkyl dimethacrylates, and mixtures thereof.

Finally, surprisingly, the inventors demonstrated that all the molar fractions between the aromatic monomer and the monomer which plays the role of a cross-linking agent were not suitable for preparing a plastic scintillator material, and that the molar proportions of the monomer playing the role of a cross-linking agent and of the aromatic monomer in the mixture (which are also the molar proportions of the units from the monomer playing the role of a cross-linking agent and of the units from the aromatic monomer in the cross-linked polymer) should be from 10% to 50% and from 90% to 50%, respectively.

The material according to the invention inter alia meets the needs and requirements listed above for a plastic scintillator material, does not have the defects of the plastic scintillator materials of the prior art and provides a solution to the problems exhibited by the plastic scintillator materials of the prior art.

The plastic scintillator material according to the invention, the polymeric matrix of which consists of the specific cross-linked polymer described above notably has scintillation, transparency, stability over time, solidity and rigidity over time properties improved as compared with the plastic scintillator materials for which the polymeric matrix consists of a non-cross-linked homopolymer or else by a polymer cross-linked by cross-linking agents, other than alkyl acrylates and alkyl methacrylates.

Without intending to be bound by any theory, it would seem that by applying a cross-linking agent which furthermore is a specific cross-linking agent and at a high content, polymerization is more rapidly total, complete, the polymerization kinetics are increased, the material is rapidly set and the fluorescent compound(s) however present at a high concentration, greater than or equal to 10% by mass, is (are) immobilized and cannot be released.

The cross-linking prevents the whitening of the material according to the invention even when it contains a high content of fluorescent compound, greater than or equal to 10% by mass of the total mass of the material. This whitening is due to the fact that polymerization in the materials of the prior art is not complete and a release of the fluorescent compound (the chromophore) occurs.

Thus, as compared with the scintillator material described in document [8] which includes a matrix consists of a cross-linked copolymer, the crosslinking agent of which is divinylbenzene, the use in the material according to the invention of alkyl diacrylates or alkyl dimethacrylates as a cross-linking agent gives the possibility of obtaining a substantial gain in transparency.

Alkyl dimethacrylates are further preferred since they are more transparent than alkyl diacrylates.

As compared with the material of the scintillator which is the subject of document [4] which includes a matrix consists of a polymer which may be cross-linked with allyl methacrylate, better stabilization and better rigidity are obtained. Indeed, the allyl groups give rise to polymers with a low average molar weight because of the hydrogen transfer reaction.

Further, it was noticed that if the proportion of cross-linking agent was less than 10% by moles, whitening of the polymer occurred the whole of the polymer, while if the proportion of cross-linking agent was greater than 50% by moles then the scintillation of the material was reduced.

The copolymer according to the invention, which not only is cross-linked but has a significant cross-linking level has properties over time which are improved as compared with the polymers of the prior art.

As a conclusion, it may be stated that the material according to the invention is not subject to any physical or morphological ageing, to whitening and to deformations over time.

The material according to the invention initially has excellent properties for discriminating between fast neutrons and gamma rays, excellent scintillation properties and excellent physico-chemical properties such as very good rigidity, as well as very great transparency. All these properties are not degraded over time, are maintained over time, unlike the materials of the prior art. The scintillator material according to the invention, unlike the materials of the prior art, may be used for several years (if one does not take into account of course the ageing due to radiations during its use) and always has excellent performances.

The material according to the invention is more transparent, in expensive, more stable, and easier to prepare than the scintillator and discriminating materials of the prior art. It may be simply prepared in large amounts with simple, widely commercially available, and inexpensive compounds.

Thus, for the first time according to the invention it is possible to prepare plastic scintillators of large volume, for example of more than 1 L, which was not possible with the scintillator materials of the prior art.

Advantageously, the molar proportions of the cross-linking agent and of the aromatic monomer in the mixture may be from 15% to 20% and from 85% to 80%, respectively.

Preferably, the aromatic monomer may be selected from among styrene; styrene substituted with one or several alkyl group(s) such as t-butylstyrene and its isomers, vinyltoluene and its isomers, and vinylxylene and its isomers; vinylnaphthalene optionally substituted with one or several alkyl group(s); N-vinylcarbazole; and mixtures thereof.

Preferably, the monomer playing the role of a cross-linking agent is 1,4-butanediyl dimethacrylate. Indeed, it was shown that the shrinkage coefficient of this cross-linking agent was particularly small.

The polymeric matrix may contain as a fluorescent compound, a first fluorescent, generally organic, compound selected from compounds having an absorption spectrum for which the maximum absorption intensity is located between 250 nm and 350 nm, for example is 300 nm, and an emission spectrum which is located between 340 nm and 400 nm.

This first fluorescent compound may be the only fluorescent compound present in the polymeric matrix.

Preferably, the first fluorescent compound is biphenyl.

Advantageously, the first fluorescent compound may be incorporated in an amount from 10% to 30% by mass, for example in an amount of 16.65% by mass, of the total mass of the material.

The polymeric matrix may further contain a second fluorescent compound, generally an organic compound, selected from compounds having an absorption spectrum which covers the emission spectrum of the first fluorescent compound, and an emission spectrum which is located between 350 nm and 650 nm, with a maximum emission intensity between 400 nm and 600 nm.

Preferably, the second fluorescent compound may be selected from bis-methylstyrylbenzene (bis-MSB), 1,4-di-[2-(5-phenyloxazolyl)]benzene (POPOP), 9,10-diphenylanthracene, 4-ethoxy-N-(2',5'-di-t-butylphenyl)-1,8-naphthalimide, and 3-hydroxyflavone.

Advantageously, the second fluorescent compound may be incorporated in an amount from 0.01% to 1% by mass, preferably in an amount from 0.01% to 0.3% by mass of the total mass of the material.

The polymeric matrix may further contain (i.e. in addition to the first fluorescent compound and to the second fluorescent compound) a third fluorescent compound, generally an organic compound, selected from compounds having an absorption spectrum which covers the emission spectrum of the second fluorescent compound, and an emission spectrum, the maximum emission intensity of which is located between 500 nm and 650 nm.

Preferably, the third fluorescent compound may be selected from perylene, 4-butylamino-N-(2',5'-di-t-butylphenyl)-1,8-naphthalimide, and all the compounds of the family of cumarins having the absorption and emission characteristics specified above.

As non-limiting examples, mention may be made of the cumarins 1, 6, 30, 102, 151, 314, 343, and yellow acridine "acridine yellow".

Advantageously, the third fluorescent compound is incorporated in an amount from 0.001% to 0.1% by mass, preferably from 0.002% to 0.05% by mass, for example at 0.005% by mass of the total mass of the material.

A particularly preferred material according to the invention may comprise a first fluorescent compound, such as biphenyl, at a concentration of 16.65% by mass of the mass of the material, a second fluorescent compound such as bis-methylstyrylbenzene or 1,4-di[2(5-phenyloxazolyl)]

benzene (POPOP), at a concentration from 0.01% to 0.3% by mass, preferably 0.1% by mass of the total mass of the material, and optionally a third fluorescent compound such as perylene or 4-butylamino-N-(2',5'-di-t-butylphenyl)-1,8-naphthalimide at a concentration from 0.002% to 0.05% by mass of the total mass of the material, preferably 0.005% by mass, in a polymeric matrix consists of a styrene polymer in an amount of 66.62% by mass of the total mass of the material and of 1,4-butanediyl dimethacrylate, in an amount of 16.65% by mass of the total mass of the material.

If it is desired that the scintillator material according to the invention also allows detection, in addition to fast neutrons, of thermal neutrons, and discrimination of the fast neutrons from the thermal neutrons and from gamma radiation then additionally at least one boron-containing compound such as ortho-carborane may be incorporated into the polymeric matrix.

This boron-containing compound may for example be present at a mass concentration from 1% to 10%, preferably 3.68% by mass of the total mass of the material.

The invention further relates to a plastic scintillator, or scintillation detector, prepared by shaping the plastic scintillator material as described above; this plastic scintillator material may not comprise any boron-containing compound as defined above or may further comprise optionally at least one boron-containing compound such as ortho-carborane in the case specified above.

According to the invention, it is possible for the first time with the plastic scintillator material according to the invention, to prepare plastic scintillators of large volume, for example of more than or equal to 1 L, preferably more than 1 L, for example from 1 L to 2 L, or even from 1 L to 5 L, which was not possible with the scintillator materials of the prior art.

The invention also relates to a detection portal comprising the scintillator according to the invention.

The invention also relates to a method for discriminating a signal due to fast neutrons from a signal due to gamma rays in a radiation comprising fast neutrons and gamma rays emitted by a mixed source, in which the plastic scintillator according to the invention is exposed to said radiation emitted by the mixed source, and the signal due to the fast neutrons is separated from the signal due to the gamma rays by Pulse Shape Discrimination ("PSD").

This "PSD" may for example be achieved either by integrating charges, or by the so called zero-crossing technique. There exist other sub-techniques for achieving this PSD.

In this method, the plastic scintillator material generally does not comprise any boron-containing compound.

Finally the invention relates to a method for discriminating from each other a signal due to fast neutrons, a signal due to thermal neutrons, and a signal due to gamma rays in a radiation comprising fast neutrons, thermal neutrons, and gamma rays emitted by a mixed source, in which the plastic scintillator according to the invention is exposed to said radiation emitted by the mixed source and the signal due to the fast neutrons is separated from the signal due to the thermal neutrons and from the signal due to gamma rays by Pulse Shape Discrimination "PSD".

There again, this "PSD" may for example be achieved either by integration of charges, or by the so-called zero-crossing technique. There exist other sub-techniques for achieving this PSD.

In other words, in this method, the signal due to fast neutrons is discriminated, from the signal due to thermal neutrons; the signal due to fast neutrons is discriminated, from the signal due to gamma rays, and the signal due to thermal neutrons is discriminated, from the signal due to gamma rays.

In the latter method, the plastic scintillator material comprises, as indicated above, a boron-containing compound.

The boron 10 isotope will capture the neutron and emit a high-energy alpha particle, which is then easy to discriminate from the gamma background noise. The boron-containing compound is not fluorescent but it is the generated alpha particle which will ionize the material over a short path and emit a <<specific>> scintillation.

The invention will be better understood upon reading the detailed description which follows, notably of particular embodiments, provided as examples. This detailed description is made in connection with the appended drawings.

In abscissa, is plotted $Q_{total}$ (i.e. the total charge of the pulse) (in picocoulombs, pC), and in ordinates is plotted $Q_{delayed}$ (i.e. the delayed portion of the integration of the pulse (tail of the signal)) (in pC).

Figure 3:
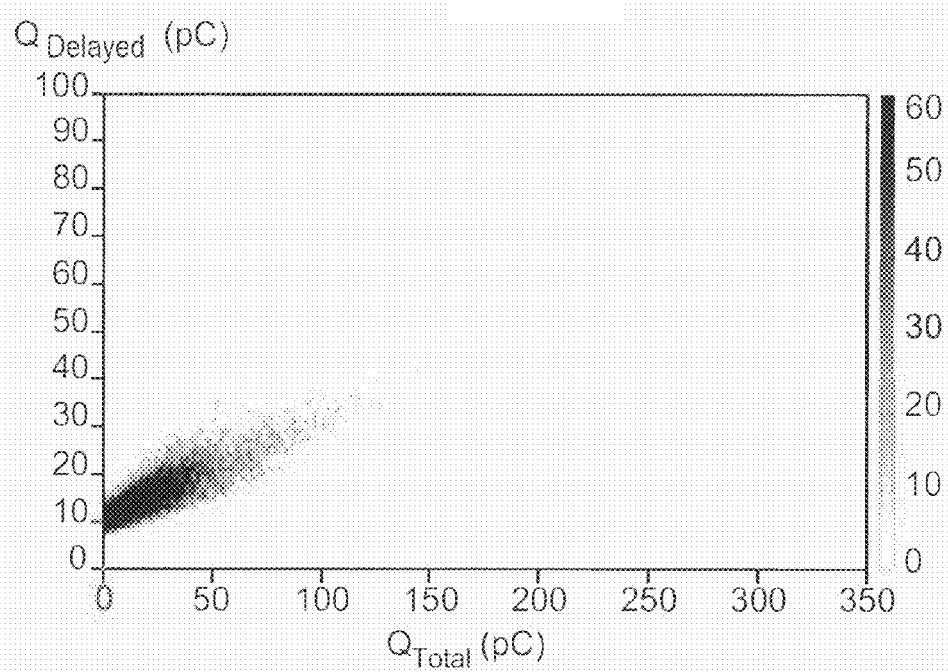

FIG. 3 is a graph which illustrates the obtained n/γ discrimination spectrum when the scintillator prepared in Example 2 is put in the presence of a californium-252 source placed at a few centimeters from the scintillator without adding any shielding.

In abscissa is plotted $Q_{total}$ (i.e. the total charge of the pulse) (in picocoulombs, pC), and in ordinates is plotted $Q_{delayed}$ (i.e. the delayed portion of the integration of the pulse (tail of the signal)) (in pC).

Figure 4:
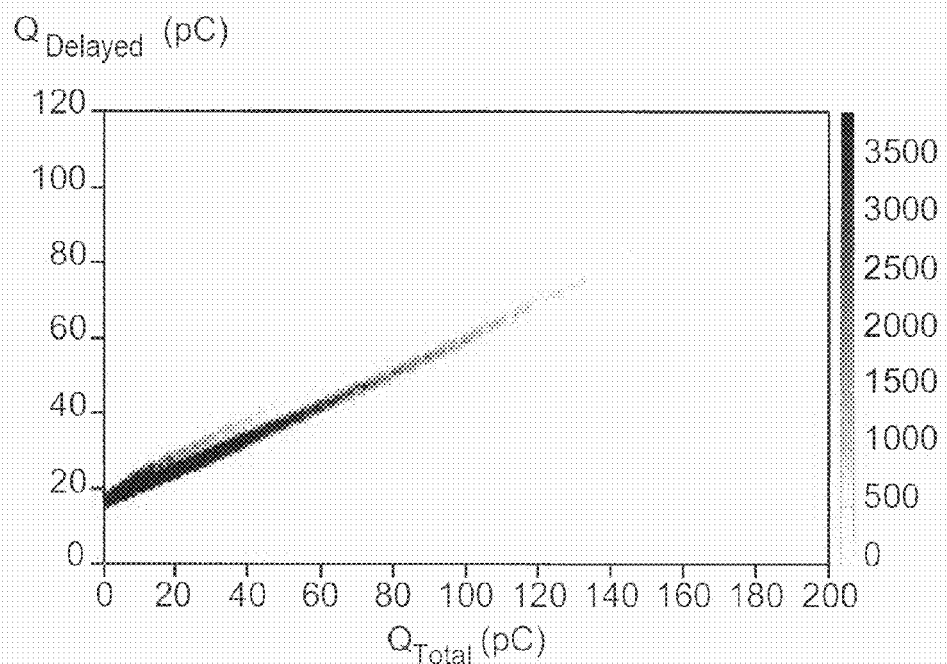

FIG. 4 is a graph which illustrates the obtained n/γ discrimination spectrum when the scintillator prepared in Example 3 is put in the presence of a californium-252 source placed at a few centimeters from the scintillator without any added shielding.

In abscissa is plotted $Q_{total}$ (i.e. the total charge of the pulse) (in picocoulombs, pC), and in ordinates in plotted $Q_{delayed}$ (i.e. the delayed portion of the integration of the pulse (tail of the signal)) (in pC).

DETAILED DISCUSSION OF PARTICULAR EMBODIMENTS

The material according to the invention comprises a polymeric matrix consisting of a cross-linked polymer which may be prepared (obtainable) by polymerization of a mixture comprising at least one aromatic monomer and a monomer playing the role of a cross-linking agent and no longer as in the prior art, a polymeric matrix consists of a homopolymer such as polystyrene or polyvinyltoluene.

As already indicated above, the crosslinking gives to the polymer transparency, solidity and rigidity properties.

In the polymeric matrix is incorporated at least one fluorescent, generally organic, molecule or compound.

Thus, in the polymeric matrix may be incorporated:

a first fluorescent, generally organic, molecule, for which the spectral properties have different features.

optionally a second fluorescent, generally organic, molecule, for which the spectral properties have different features.

if the targeted application requires this, optionally a third fluorescent, generally organic, molecule, for which the spectral properties have different features.

Polymeric Matrix.

During the interaction between any radiation and the material, the latter should be capable of suitably transferring the deposited energy.

In the case of a plastic scintillator material, the material is nothing other than the polymeric matrix.

Practically, the polymer of the polymeric matrix of the material according to the invention has a large number of aromatic groups which will be ionized after radiation-material interaction.

On the travel of the ion, the different molecules will be ionized and then recombinations will take place giving themselves following de-excitations. The de-excitation will occur radiatively by emission of a fluorescence photon.

For this, the polymer will in majority have units derived from the polymerization of an aromatic monomer.

As already specified above, by an aromatic monomer, is generally meant herein a monomer comprising at least one aromatic ring. This (these) aromatic ring(s) may be selected from aromatic carbon cycles, or hetero-aromatic rings, each of these rings may comprise from 3 to 10 atoms, for example from 6 to 8 atoms. The hetero-atom(s) may be selected from N, O, P or S. The aromatic monomer may for example be selected from monomers comprising a benzene ring, a naphthyl group or a carbazole ring. The aromatic ring(s) may further be substituted with one or several groups selected from alkyl groups.

According to the invention, this monomer further comprises a polymerizable group.

Said polymerizable group is generally selected from groups comprising an ethylenically unsaturated carbon-carbon double bond such as the vinyl group.

Preferably, the aromatic monomer may be selected from styrene; styrenes substituted with one or several alkyl groups such as t-butylstyrene and its isomers, vinyltoluene and its isomers, vinylxylene and its isomers; vinylnaphthalene optionally substituted with one or several alkyl groups; N-vinylcarbazole; and mixtures thereof.

When the polymer is prepared from a single aromatic monomer, and from the cross-linking agent, this may then be referred to as a polymer cross-linked with the cross-linking agent.

When the polymer is prepared from several different aromatic monomers, and from the cross-linking agent, this may be referred to as a copolymer cross-linked with the cross-linking agent.

The cross-linking is achieved by means of molecules which may have at least two polymerizable double bonds.

According to the invention, very good results are observed when the cross-linking is achieved by using as a cross-linking agent, alkyl diacrylates fitting the following general formula (I) or alkyl dimethacrylates fitting the following general formula (II):

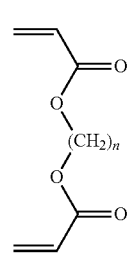

(I)

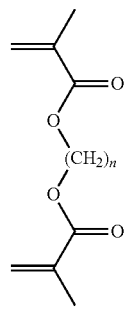

(II)

wherein n is an integer generally from 1 to 20, preferably from 2 to 6. n may assume all the values between 1 and 20, for example 1, 2, 3, 4, 5 or 6.

Preferably, 1,4-butanediyl dimethacrylate is used.

It was surprisingly demonstrated according to the invention that all the molar fractions between an aromatic monomer and a cross-linking agent were not suitable for notably obtaining the sought transparency, stability and discrimination potential properties.

A range from 10% to 50% by moles of cross-linking agent in the polymerization mixture and a range from 90% to 50% of aromatic monomer are particularly suitable for preparing the scintillator materials according to the invention.

Preferably, the cross-linking agent percentage used is comprised between 15% and 20% by moles of the polymerization mixture. In this range, the sought transparency, stability, and discrimination potential properties are further reinforced.

The polymeric matrix should be as transparent as possible at the emission wavelength of the incorporated fluorophore(s); typically the scintillator should be transparent at wavelengths above 400 nm.

A gain in transparency is obtained by the use of alkyl diacrylates and even more of alkyl dimethacrylates which are known for being transparent in the near UV.

Among these diacrylates and dimethacrylates, 1,4-butanediyl dimethacrylate is preferably used because of its shrinkage coefficient which is the lowest from among all of the compounds which were able to be tested.

As an example, the observed density of the material according to the invention such as the material of Example 1, has the value of 1.08.

The cross-linked polymer or cross-linked copolymer of the material according to the invention may be prepared by any polymerization method known to the man skilled in the art.

However, in order that the polymer has a minimum of impurities, the polymerization is preferably conducted by thermal initiation.

It is not necessary to add a radical initiator known to the man skilled in the art such as AIBN or benzoyl peroxide.

If however it is difficult to attain completion of the polymerization, it is then possible, in this case, to use a radical initiator selected for example from the two aforementioned radical initiators, at a mass concentration generally comprised between 0.01% and 1% of the total mass of the material.

First Fluorescent Molecule

The first fluorescent, generally organic, molecule may be selected so as to have an absorption spectrum, in which the maximum absorption intensity is located between 250 and 350 nm, for example this maximum absorption intensity may be centered on 300 nm.

Once it is excited, this molecule is then capable of emitting photons for which the corresponding wavelength is located between 340 and 400 nm, for example, for which the maximum emission intensity may be centered on 360 nm.

Further, the first fluorescent molecule, since it is generally incorporated into the matrix at a high mass content, should advantageously have a high solubility constant in apolar solvents.

In terms of mass concentration, a mass concentration of at least 10% by mass of this first fluorescent molecule based on the total mass of the material, is generally used so that the scintillator material has satisfactory n/y discrimination capabilities.

Advantageously, incorporation levels comprised between 10% and 30% by mass of the total mass of the material may be used. Typically, a scintillator material consisting of a polymeric matrix and of a first fluorescent molecule or fluorescent compound 16.65% by mass of the total mass of the material, is an example of a scintillator material according to the invention.

Within the scope of the invention and after many conducted tests, it was found that biphenyl has all the aforementioned features.

Second Fluorescent Molecule

In addition to the first fluorescent molecule, a second fluorescent, generally organic, molecule may be incorporated into the polymeric matrix.

The optional second fluorescent molecule may be selected so as to have an absorption spectrum capable of covering the emission spectrum of the first fluorescent molecule, notably for optimizing energetic transfers between two fluorescent molecules, which, in other words means that the second fluorescent molecule is able to absorb photons of wavelengths belonging to the emission spectrum of said first fluorescent molecule on the one hand and subsequently to this absorption, of emitting photons on the other hand so that the emission spectrum of said second fluorescent molecule ranges from 350 to 650 nm with a maximum emission intensity comprised between 400 and 600 nm.

The content at which the second fluorescent molecule is incorporated into the polymeric matrix is much more reduced than that of the first fluorescent molecule.

Typically, a concentration of the second fluorescent molecule comprised between 0.01% and 1% by mass of the total mass of the material, preferably from 0.01% to 0.3% by mass of the total mass of the material is used.

The second fluorescent compound may for example be selected from among the compounds already mentioned above such as bis-methylstyrylbenzene (bis-MSB) or POPOP, POPOP being preferred over bis-MSB.

Third Fluorescent Molecule

In addition to the first fluorescent molecule and to the second fluorescent molecule, a third fluorescent, generally organic, molecule may be incorporated into the polymeric matrix.

This third fluorescent molecule may be selected so as to have an absorption spectrum able to cover the emission spectrum of the second fluorescent molecule, notably for optimizing energy transfers between both fluorescent molecules (i.e. the second and third fluorescent molecules) and improving the intrinsic efficiency of the scintillation detector.

In other words, this means that the third fluorescent molecule is able to absorb photons with wavelengths belonging to the emission spectrum of said second fluorescent molecule, said third fluorescent molecule being able, subsequently to this absorption, to emit photons, so that the emission spectrum of said third fluorescent molecule has a maximum emission intensity comprised between 500 and 600 nm.

The contents at which the third fluorescent molecule is incorporated into the polymeric matrix is much more reduced than that of the first fluorescent molecule.

Typically, a concentration of the third fluorescent molecule from 0.001% to 0.1% by mass of the total mass of the material, preferably from 0.002% to 0.05% by mass, for example 0.005% by mass of the total mass of the material is used.

The third fluorescent compound may be selected from the compounds already mentioned above, such as perylene and 4-butylamino-N-(2',5'-di-t-butylphenyl)-1,8-naphthalimide, perylene being preferred. In an embodiment, the scintillator material according to the invention may also allow detection in addition to fast neutrons, thermal neutrons by capturing the latter with boron.

In this embodiment, the composition of the plastic scintillator material giving the possibility of distinguishing between fast and thermal neutrons from gamma radiation is as this has already been described above, but further comprises at least one boron-containing molecule different from the fluorescent molecules, such as ortho-carborane.

This boron-containing molecule may be present at a mass concentration of 1% to 10%, preferably 3.68% by mass of the total mass of the material.

As a non-limiting example, a scintillator material according to the invention and having properties for discriminating between fast neutrons and gamma rays may comprise a first molecule, a first fluorescent compound of the biphenyl type, at a concentration of about 10% to 30% by mass of the total mass of the material, preferably 16.65% by mass of the total mass of the material, a second fluorescent molecule of the type mentioned above like bis-methylstyrylbenzene (bis-MSB) or POPOP (POPOP being preferred over bis-MSB), at a mass concentration comprised between 0.01% and 0.3%, preferentially 0.1% of the total mass of the material, and optionally, if necessary, a third fluorescent molecule like perylene or 4-butylamino-N-(2',5'-di-t-butylphenyl)-1,8-naphthalimide (perylene being preferred), at a concentration comprised between 0.002% and 0.05% by mass of the mass of the material, preferably 0.005% by mass of the mass of the material, the whole in a copolymeric matrix consisting of a mixture of 66.62% by mass of styrene based on the total mass of the material, and of 16.65% by mass of 1,4-butanediyl dimethacrylate based on the mass of the material.

From the scintillator material according to the invention, a scintillator or scintillation detector is prepared by shaping the plastic scintillator material which has just been described.

The shaping may be carried out during the preparation of the material for example by preparing a liquid mixture of the aromatic monomer, of the cross-linking agent (the aromatic monomer and the cross-linking agent having been suitably purified beforehand for removing their radical inhibitors), of the fluorescent compound(s), and optionally of the boron-containing compound, and then by pouring this mixture into a mould with the shape of the desired scintillator. It is then proceeded with polymerization in the mould, generally by heating the mixture. After cooling, the thereby obtained scintillator is released from the mould.

The scintillator is then generally reworked, for example with a lathe, and then at least one of its surfaces is polished in order to obtain a compatible surface condition with the sought applications.

The scintillator according to the invention may have any shape. Generally it has the shape of a straight cylinder with a circular section.

It has already been seen that for the first time, it is possible with the plastic scintillator material according to the invention notably because the matrix is cross-linked, to prepare plastic scintillators of large volume, for example of more than 1 L, preferably from 1 L to 2 L, or even from 1 L to 5 L, which was not possible with the scintillator materials of the prior art.

Thus the scintillators according to the invention may appear as cylinders with a height of 17 cm and a diameter of 12 cm while the scintillators of the prior art generally appear as cylinders with a height of 8 cm and a diameter of 8 cm.

These scintillators even with a large volume are of reduced cost and have all the advantageous properties inherent to the material according to the invention, as they were listed above. In particular, such a scintillator is extremely stable and may be kept for years without any particular precautions without being subject to ageing and to degradations of its properties notably of its discrimination properties.

The scintillator according to the invention may notably be integrated into a detection portal.

The targeted applications for the scintillators according to the invention notably comprise the detection of the flux of neutrons by removing the background noise notably due to gamma rays necessarily accompanying the emissions of neutrons.

When a gamma ray interacts with an organic medium, it directly ionizes the scintillator and an electric signal is recorded stemming from a so called fast fluorescence component.

When a neutron interacts with an organic medium, it transfers its energy to so called rear protons which then ionize the scintillator and an electric signal is recorded stemming from a so called slow fluorescent component.

Therefore it is by pulse shape discrimination (PSD) that the separation of the signals is achieved, more particularly here by comparison of the slow component of the signals assigned to gamma rays or to neutrons, the gamma signal generally having a smaller slow time component than the neutron signal.

The system, in addition to the scintillator comprises a photomultiplier (PM), which should be adapted to the emission wavelength of the organic scintillator. The system, once it is under high voltage is isolated from the light in order to minimize the background noise. The signal at the output of the photomultiplier is then processed in a suitable electronic chain notably including a QDC ("Charge to Digital Converter") allowing integration of charges and separation of the signals.

The invention will now be described with reference to the following examples, given as an illustration and not as a limitation.

EXAMPLES

Example 1

In this example, a plastic scintillator according to the invention is prepared.

Pure styrene (66.62% by mass of the 1,268 g mixture), pure 1,4-butanediyl dimethacrylate (16.65% by mass of the mixture, 317 g), biphenyl (16.65% by mass of the mixture, 317 g) and POPOP (0.08% by mass of the mixture, 1.37 g) are mixed under an inert atmosphere in a dry flask.

The mixture is rid of any gas by the cold degassing method in vacuo (corresponding to the "freeze-pump-thaw" terminology), and then it is poured with precaution into a glass mould elaborated for giving the final shape of the plastic scintillator to be obtained.

Typically, the glass mould used within the scope of this example is a cylindrical glass bottle with contents of 2.5 L.

The mixture placed in the mould is heated to 50° C. for 7 to 14 days.

The obtained product is then removed from the mould, reworked with the lathe and then polished on one of its two largest sides until a surface condition optically compatible with the sought applications is obtained.

The thereby prepared plastic scintillator proves to be stable and may be kept without any particular precaution for several years.

Figure 1:
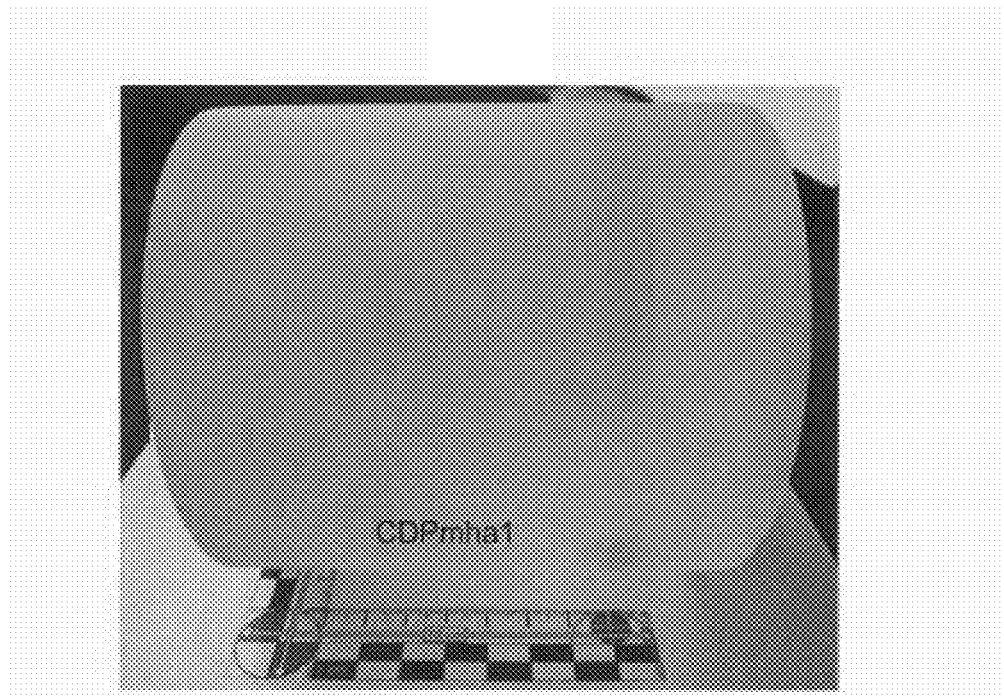
FIG. 1 is a photograph which shows the scintillator prepared in Example 1.

A photograph of this scintillator is shown in FIG. 1.

This plastic scintillator is then integrated into an experimental assembly in order to show that it gives the possibility of obtaining discrimination of the signals due to gamma rays from the signals due to neutrons emitted by a mixed source.

The experimental set up put into place comprises a mixed source of neutrons and gamma rays, i.e. a source of californium-252 ($^{252}$Cf, with an activity of about 1 MBq) of the scintillator and a photomultiplier (PM).

The photomultiplier is adapted to the emission wavelength of the organic scintillator.

The system once it is under high voltage is isolated from light in order to minimize the background noise.

The signal at the output of the photomultiplier is then processed in an adapted electronic chain notably including a "QDC" ("Charge to Digital Converter") allowing integration of charges and separation of the signals.

It is by pulse shape discrimination that the separation of the signals is achieved, more particularly hereby charge integration, by comparing the slow component of the signals assigned to the gammas or to the neutrons, the gamma signal generally having a smaller slow time component than the neutron signal. Specifically we adjust the integration time gates allowing the separation of both of these components as this is shown in FIG. 2.

A first time gate gives the possibility of integrating the signal in its entirety (total charge), while a second time gate allows only dealing with the portion of the signal where the gamma signal will be differentiated from the neutron signal: the delayed portion of the signal. Thus, this second gate allows integration of the slow charge of the signals.

Figure 2:
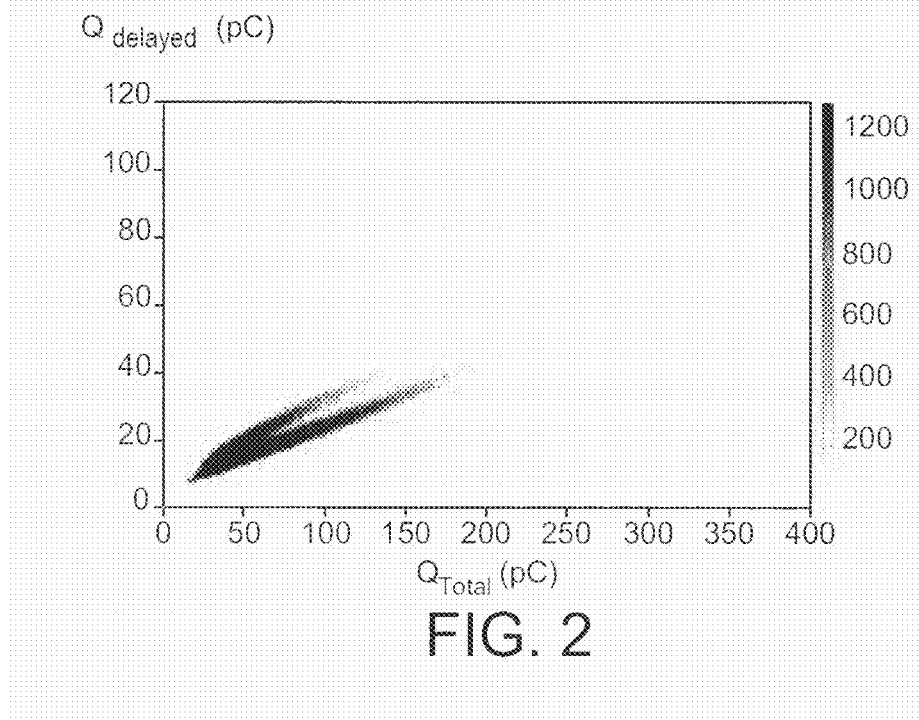
FIG. 2 is a graph which illustrates the obtained n/γ discrimination spectrum when the scintillator prepared in Example 1 is put in the presence of a californium-252 source placed at a few centimeters from the scintillator without adding any shielding.

FIG. 2 therefore represents the n/γ discrimination spectrum obtained when the scintillator prepared as this has been described above, is put in the presence of a californium-252 source ($^{252}$Cf, with an activity of about 1 MBq), placed at a few centimeters from the scintillator without adding any shielding.

In this figure, two lobes may be viewed, each of them either representing the contribution of the gamma signals (the lower lobe), or the contribution of the neutron signals (the upper lobe). Below 50 pC of total charge, both lobes join up which defines the energy limits of the discrimination of the scintillator. On the other hand, above 50 pC, both lobes are clearly separated, which clearly allows us to state that the discrimination between fast neutrons and gamma rays is possible.

Example 2

In this example, a plastic scintillator according to the invention is prepared.

Pure styrene (66.62% by mass of the mixture, 16.308 g), pure 1,4-butanediyl dimethacrylate (16.65% by mass of the mixture, 4.077 g), biphenyl (16.65% by mass of the mixture, 4.077 g), POPOP (0.08% by mass of the mixture, 20.4 mg) and perylene (0.004% by mass of the mixture, 1.0 mg) are mixed under an inert atmosphere in a dry flask.

The mixture is rid of any gas by the cold degassing method in vacuo (corresponds to the "freeze-pump-thaw" terminology), and then is poured with precaution into a glass mould elaborated for giving the final shape of the plastic scintillator to be obtained.

Typically, the glass mould used within the scope of this example is a cylindrical glass bottle with a capacity of 50 mL.

The mixture placed in the mould is heated to 60° C. for 7 to 14 days.

The obtained product is then removed from the mould, reworked with the lathe and then polished on one of its two largest sides until a surface condition optically compatible with the sought applications is obtained.

The thereby prepared plastic scintillator proves to be stable and may be kept without any particular precaution for several years.

This plastic scintillator is then integrated into an experimental assembly in order to show that it is possible to obtain discrimination of the signals due to gamma rays from the signals due to neutrons emitted by a mixed source.

The experimental assembly set into place comprises a mixed source of neutrons and gammas, i.e. a source of californium-252 ($^{252}$Cf, with an activity of about 1 MBq) the scintillator, and a photomultiplier (PM). The discrimination figure is shown in FIG. 3.

Example 3

In this example, a plastic scintillator according to the invention is prepared.

Pure styrene (62.07% by mass of the mixture 7.248 g), pure 1,4-butanediyl dimethacrylate (15.60% by mass of the mixture, 1.822 g), biphenyl (15.60% by mass of the mixture, 1.822 g), p-terphenyl (3.00% by mass of the mixture, 350 mg), POPOP (0.04% by mass of the mixture, 5 mg) and o-carborane (3.68% by mass of the mixture, 430 mg) are mixed under an inert atmosphere in a dry flask.

The mixture is rid of any gas by the cold degassing method in vacuo (corresponding to the "freeze-pump-thaw" terminology), and then it is poured with precaution into a glass mould elaborated for giving the final shape of the plastic scintillator to be obtained.

Typically, the glass mould used within the scope of this example is a cylindrical glass bottle with a capacity of 50 mL.

The mixture placed in the mould is heated to 60° C. and 90° C. for 7 to 14 days.

The obtained product is then removed from the mould, reworked with the lathe and then polished on one of its two largest sides until a surface condition optically compatible with the sought applications is obtained.

The thereby prepared plastic scintillator proves to be stable and may be kept without any particular precaution for several years.

The plastic scintillator is then integrated into an experimental assembly in order to show that it is possible to obtain discrimination of the signals due to gamma rays from the signals due to neutrons emitted by a mixed source.

The experimental assembly set into place comprises a mixed source of neutrons and gammas, i.e. a source of californium-252 ($^{252}$Cf, with an activity of about 1 MBq), the scintillator, with a high density polyethylene bar with a thickness (5 cm) between the source and the scintillator and a photomultiplier (PM). The discrimination pattern is shown in FIG. 4.

The flux of thermal neutrons is present in the low portion, in terms of total charge in abscises, hidden in the fast neutron lobe, the upper lobe in FIG. 4.

In order to demonstrate this in a clearer way, the discrimination method called "zero crossing method" would be more suitable, an example is shown in the publication of Normand [9] where the plastic scintillator is doped with boron under the same proportions as the plastic scintillator as described in this example.

REFERENCES

[1] Peerani, P.; Tomanin, A.; Pozzi, S.; Dolan, J.; Miller, E.; Flaska, M.; Battaglieri, M.; De Vita, R.; Ficini, L.; Ottonello, G.; Ricco, G.; Dermody, G.; Giles, C., Nucl. Instr. and Meth. A 2012, 696, 110-120.

[2] Knoll, G. F. *Radiation Detection and Measurement* (*Third Edition*); Wiley, 2010.

[3] Kouzes, R. T.; Ely, J. R.; Lintereur, A. T.; Stephens, D. L. PNNL Reports, 2009, PNNL-18903.

[4] Brooks, F. D.; Pringle, R. W.; Funt, B. L., IRE Trans. Nuc. Sci. 1960, NS-7, 35-38.

[5] Iwanowska, J.; Swiderski, L.; Moszynski, M.; Szczesniak, T.; Sibczynski, P.; Galunov, N. Z.; Karavaeva, N. L., JINST 2011, 6, P07007.

[6] (a) Zaitseva, N.; Carman, L.; Glenn, A.; Hamel, S.; Payne, S. A.; Rupert, B. L. 2012, WO-2012142365.

(b) Zaitseva, N.; Rupert, B. L.; Pawelczak, I.; Glenn, A.; Martinez, H. P.; Carman, L.; Faust, M.; Cherepy, N.; Payne, S., Nucl. Instr. and Meth. A 2012, 668, 88-93.

[7] (a) Doty, F. P.; Allendorf, M. D.; Feng, P. L., 2011, WO-2011/060085.

(b) Feng, P. L.; Villone, J.; Hattar, K.; Mrowka, S.; Wong, B. M.; Allendorf, M. D.; Doty, F. P., IEEE Trans. Nuc. Sci. 2012, 59, 3312-3319.

[8] Simonetti, J. J.; Ziegler, W. P.; Durner Jr., E. F.; Busser, C. D. M., Demande de brevet FR-A-2 844 885 (2003).

[9] Normand, S.; Mouanda, B.; Haan, S.; Louvel, M., Nucl. Instr. and Meth. A 2002, 484, 342-350.

The invention claimed is:

1. A plastic scintillator material, comprising a polymeric matrix into which is incorporated at least one fluorescent compound at a mass concentration greater than or equal to 10% by mass of the total mass of the material, wherein:

the polymeric matrix comprises a crosslinked polymer obtainable by polymerization of a mixture comprising at least one aromatic monomer and at least one monomer which is a crosslinking agent selected from the group consisting of an alkyl diacrylate, an alkyl dimethacrylate, and a mixture thereof; and molar proportions of the crosslinking monomer and of the aromatic monomer in the mixture are from 10% to 50% and from 90% to 50%, respectively.

2. The material according to claim 1, wherein the molar proportions of the crosslinking monomer and of the aromatic monomer in the mixture are from 15% to 20% and from 85% to 80%, respectively.

3. The material according to claim 1, wherein the aromatic monomer is selected from the group consisting of styrene, a styrene substituted with one or several alkyl group(s), vinyl-naphtalene, vinylnaphtalene substituted with one or several alkyl group(s), N-vinylcarbazole, and a mixture thereof.

4. The material according to claim 3, wherein the styrene substituted with one or several alkyl group(s) is selected from the group consisting of t-butylstyrene and its isomers, vinyltoluene and its isomers, and vinylxylene and its isomers.

5. The material according to claim 1, wherein the crosslinking monomer is 1,4-butanediyl dimethacrylate.

6. The material according to claim 1, wherein the polymeric matrix comprises, as a fluorescent compound, a first fluorescent compound which is a compound having an absorption spectrum for which the maximum absorption intensity is located between 250 nm and 350 nm, and an emission spectrum which is located between 340 nm and 400 nm.

7. The material according to claim 6, wherein the first fluorescent compound is biphenyl.

8. The material according to claim 6, wherein the first fluorescent compound is present in an amount from 10% to 30% by mass, relative to a total mass of the material.

9. The material according to claim 6, wherein the polymeric matrix further comprises a second fluorescent compound having an absorption spectrum covering the emission spectrum of the first fluorescent compound, and an emission spectrum which is located between 350 nm and 650 nm, and having a maximum emission intensity between 400 and 600 nm.

10. The material according to claim 9, wherein the second fluorescent compound is selected from the group consisting of bis-methylstyryl benzene (bis-MSB), 1,4-di-[2-(5-phenyloxazolyl)]benzene (POPOP), 9,10-diphenyl anthracene, 4-ethoxy-N-(2',5'-di-t-butylphenyl)-1,8-naphthalimide and 3-hydroxyflavone.

11. The material according to claim 9, wherein the second fluorescent compound is present in an amount from 0.01% to 1% by mass, relative to a total mass of the material.

12. The material according to claim 9, wherein the polymeric matrix further comprises a third fluorescent compound having an absorption spectrum covering the emission spectrum of the second fluorescent compound, and having an emission spectrum for which the maximum emission intensity is located between 500 nm and 650 nm.

13. The material according to claim 12, wherein the third fluorescent compound is selected from the group consisting of perylene, 4-butylamino-N-(2',5'-di-t-butylphenyl)-1,8-naphthalimide, a cumarin compound, and acridine yellow.

14. The material according to claim 13, wherein the cumarin compound is selected from the group consisting of cumarins 1, 6, 30, 102, 151, 314, and 343.

15. The material according to claim 12, wherein the third fluorescent compound is present in an amount from 0.001% to 0.1% by mass, relative to a total mass of the material.

16. The material according to claim 1, comprising:
a first fluorescent compound at a concentration of 16.65% by mass of the total mass of the material;
a second fluorescent compound at a concentration from 0.01% to 0.3% by mass; and
in a polymeric matrix comprising a polymer of styrene in an amount of 66.62% by mass of the total mass of the material and of 1,4-butanediyl dimethacrylate, in an amount of 16.65% by mass of the total mass of the material.

17. The material according to claim 16, wherein
the first fluorescent compound is biphenyl,
the second fluorescent compound is bis-methylstyrylbenzene or 1,4-di[2(5-phenyloxazolyl)]benzene (POPOP), and
the third fluorescent compound is perylene or 4-butylamino-N-(2',5'-di-t-butylphenyl)-1,8-naphthalimide.

18. The material according to claim 16, further comprising: a third fluorescent compound at a concentration from 0.002% to 0.05% by mass of the total mass of the material.

19. The material according to claim 1, wherein the polymeric matrix further comprises at least o boron-containing compound.

20. The material according to claim 19, wherein the mass concentration of the boron-containing compound is from 1% to 10%.

21. A plastic scintillator prepared by shaping the material according to claim 1.

22. A plastic scintillator prepared by shaping the material according to claim 19.

23. A method for discriminating from each other, a signal due to fast neutrons, a signal due to thermal neutrons, and a signal due to gamma rays in a radiation comprising fast neutrons, thermal neutrons and gamma rays emitted by a mixed source, the method comprising:
exposing the plastic scintillator of claim 22 to said radiation emitted by the mixed source; and
separating the signal due to fast neutrons from the signal due to thermal neutrons, and from the signal due to gamma rays, by pulse shape discrimination (PSD).

24. The plastic scintillator according to claim 22, wherein the scintillator has a volume greater than or equal to 1 L.

25. The plastic scintillator according to claim 21, wherein the scintillator has a volume greater than or equal to 1 L.

26. A detection portal, comprising the plastic scintillator according to claim 21.

27. A method for discriminating a signal due to fast neutrons from a signal due to gamma rays in a radiation comp sing fast neutrons and gamma rays emitted by a mixed source, the method comprising:
exposing the plastic scintillator of claim 21 to said radiation emitted by the mixed source; and
separating the signal due to fast neutrons from the signal due to gamma rays by pulse charge discrimination (PSD).

* * * * *